US012323883B2

(12) United States Patent
Baird et al.

(10) Patent No.: US 12,323,883 B2
(45) Date of Patent: *Jun. 3, 2025

(54) SELF-MAPPING LISTENERS FOR LOCATION TRACKING IN WIRELESS PERSONAL AREA NETWORKS

(71) Applicant: T-Mobile USA, Inc., Bellevue, WA (US)

(72) Inventors: Joseph Baird, Kent, WA (US); Barry Butterklee, Sammamish, WA (US); William Parker, Brier, WA (US); John Depew, Sunnyvale, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,812

(22) Filed: Mar. 4, 2024

(65) Prior Publication Data

US 2024/0205644 A1   Jun. 20, 2024

Related U.S. Application Data

(63) Continuation of application No. 17/408,348, filed on Aug. 20, 2021, now Pat. No. 11,924,711.

(51) Int. Cl.
*H04W 4/029* (2018.01)
*G01S 5/00* (2006.01)
*G01S 5/02* (2010.01)
*G01S 5/14* (2006.01)
*H04W 4/02* (2018.01)

(52) U.S. Cl.
CPC .......... *H04W 4/029* (2018.02); *G01S 5/0072* (2013.01); *G01S 5/0289* (2013.01); *G01S 5/14* (2013.01); *H04W 4/023* (2013.01); *H04W 4/026* (2013.01)

(58) Field of Classification Search
CPC ........ G01S 5/0072; G01S 5/0289; G01S 5/14; H04W 4/023; H04W 4/026
USPC ...................................................... 455/456.3
See application file for complete search history.

(56) References Cited

U.S. PATENT DOCUMENTS

| | | | |
|---|---|---|---|
| 6,833,787 | B1 | 12/2004 | Levi |
| 7,113,610 | B1 | 9/2006 | Chrysanthakopoulos |
| 7,778,591 | B1 | 8/2010 | Van et al. |

(Continued)

FOREIGN PATENT DOCUMENTS

| | | |
|---|---|---|
| CN | 110381430 B | 7/2021 |
| DE | 3620170 A1 | 12/1987 |

(Continued)

*Primary Examiner* — Ted M Wang
(74) *Attorney, Agent, or Firm* — Perkins Coie LLP

(57) ABSTRACT

A listening device for tracking locations of a tracking device in a physical space includes one or more wireless transceivers, one or more sensors, and one or more processors. The processors generate positional indicators associated with the listening device based on signals generated by the one or more sensors, based on communications with an external device, or both. The listening device communicates with the tracking device to receive a tracking signal, based on which the processors identify a position of the tracking device relative to the listening device. The tracking device is located within the physical space based on the identified position of the tracking device relative to the listening device and the positional indicators associated with the listening device.

20 Claims, 5 Drawing Sheets

(56) References Cited

U.S. PATENT DOCUMENTS

| | | |
|---|---|---|
| 8,049,616 B2 | 11/2011 | Hill |
| 8,073,157 B2 | 12/2011 | Mao et al. |
| 8,497,774 B2 | 7/2013 | Scalisi et al. |
| 8,831,255 B2 | 9/2014 | Crawford et al. |
| 8,976,986 B2 | 3/2015 | Angeloff et al. |
| 9,084,058 B2 | 7/2015 | Reilly et al. |
| 9,226,090 B1 | 12/2015 | Norris et al. |
| 9,465,803 B2 | 10/2016 | Sik et al. |
| 9,496,968 B2 | 11/2016 | Bakar |
| 9,756,446 B2 | 9/2017 | Johnson et al. |
| 9,921,799 B2 | 3/2018 | Touch et al. |
| 9,949,054 B2 | 4/2018 | Kadri et al. |
| 9,955,279 B2 | 4/2018 | Riggs et al. |
| 9,973,584 B2 | 5/2018 | Poliashenko et al. |
| 9,973,874 B2 | 5/2018 | Stein et al. |
| 9,998,847 B2 | 6/2018 | Norris et al. |
| 9,998,906 B2 | 6/2018 | Moldavsky et al. |
| 10,129,908 B2 | 11/2018 | Kwon et al. |
| 10,163,295 B2 | 12/2018 | Miura |
| 10,225,681 B1 | 3/2019 | Lyren |
| 10,299,064 B2 | 5/2019 | Di Censo et al. |
| 10,412,183 B2 | 9/2019 | Gibson et al. |
| 10,813,092 B2 | 10/2020 | Dinan |
| 10,939,431 B2 | 3/2021 | Bhattad et al. |
| 11,001,284 B2 | 5/2021 | Abrosimov et al. |
| 11,044,559 B2 | 6/2021 | Marten |
| 2014/0155098 A1* | 6/2014 | Markham ............ H04L 1/22 455/456.3 |
| 2015/0058437 A1 | 2/2015 | Taylor et al. |
| 2016/0011255 A1 | 1/2016 | Ganesh |
| 2016/0345137 A1 | 11/2016 | Ruiz |
| 2018/0239010 A1* | 8/2018 | Mindell ............ G01S 13/34 |
| 2019/0279193 A1 | 9/2019 | Kievit et al. |
| 2019/0370280 A1 | 12/2019 | Shenoy et al. |
| 2020/0042554 A1 | 2/2020 | Liu et al. |
| 2020/0205195 A1 | 6/2020 | Sun et al. |
| 2020/0264830 A1 | 8/2020 | Kline et al. |
| 2020/0275485 A1 | 8/2020 | Babaei et al. |
| 2020/0322868 A1 | 10/2020 | Claffey et al. |
| 2020/0351758 A1 | 11/2020 | Bhattad et al. |
| 2020/0404610 A1 | 12/2020 | Crouch et al. |
| 2021/0006925 A1 | 1/2021 | Munoz et al. |
| 2021/0061225 A1 | 3/2021 | Ahmed et al. |
| 2021/0174535 A1 | 6/2021 | Patil et al. |

FOREIGN PATENT DOCUMENTS

| | | |
|---|---|---|
| DE | 3838892 C2 | 1/1990 |
| DE | 4202609 A1 | 8/1992 |
| DE | 19512387 C1 | 10/1996 |
| DE | 19523515 C2 | 1/1998 |
| DE | 19745392 A1 | 5/1998 |
| DE | 19706137 A1 | 8/1998 |
| DE | 4121196 C2 | 3/1999 |
| DE | 19920382 A1 | 11/2000 |
| DE | 19940640 A1 | 3/2001 |
| DE | 19961862 A1 | 5/2001 |
| DE | 10018666 A1 | 10/2001 |
| DE | 10107385 A1 | 9/2002 |
| DE | 10123054 A1 | 11/2002 |
| DE | 10125229 A1 | 11/2002 |
| DE | 69810851 T2 | 1/2004 |
| DE | 69813039 T2 | 1/2004 |
| DE | 69433258 T2 | 7/2004 |
| DE | 10020756 B4 | 8/2004 |
| DE | 69533343 T2 | 12/2004 |
| DE | 69727933 T2 | 1/2005 |
| DE | 69924743 T2 | 3/2006 |
| DE | 69733856 T2 | 6/2006 |
| DE | 102005001395 B4 | 7/2006 |
| DE | 69834466 T2 | 12/2006 |
| DE | 202005021355 U1 | 9/2007 |
| DE | 102006054961 A1 | 5/2008 |
| DE | 60131841 T2 | 12/2008 |
| DE | 19645339 B4 | 5/2010 |
| DE | 10138949 B4 | 12/2010 |
| DE | 19941599 B4 | 3/2011 |
| DE | 102008013635 B4 | 6/2011 |
| DE | 102009015174 B4 | 12/2011 |
| DE | 102008047212 B4 | 4/2012 |
| DE | 202006021056 U1 | 5/2012 |
| DE | 11005410 T1 | 9/2012 |
| DE | 202012103377 U1 | 9/2012 |
| DE | 102012105394 A1 | 12/2012 |
| DE | 102011086509 A1 | 5/2013 |
| DE | 112012005770 T5 | 10/2014 |
| DE | 102013218176 A1 | 3/2015 |
| DE | 112014005855 T5 | 12/2016 |
| DE | 102018120958 A1 | 2/2019 |
| DE | 202014011337 U1 | 6/2019 |
| DE | 102018209720 B3 | 7/2019 |
| DE | 102018102743 A1 | 8/2019 |
| DE | 112017006375 T5 | 9/2019 |
| DE | 102019132544 A1 | 6/2020 |
| DE | 112018001093 T5 | 6/2020 |
| DE | 112013007545 B4 | 9/2020 |
| DE | 112018003906 T5 | 9/2020 |
| DE | 112019000465 T5 | 9/2020 |
| DE | 112019001916 T5 | 12/2020 |
| DE | 102019208742 B4 | 1/2021 |
| DE | 102020120784 A1 | 2/2021 |
| DE | 102020120785 A1 | 2/2021 |
| DE | 102019125234 A1 | 3/2021 |
| JP | 5265387 B2 | 5/2013 |
| KR | 101021592 B1 | 3/2011 |
| KR | 20110103201 A | 9/2011 |
| KR | 20210056945 A | 5/2021 |
| WO | 2016071774 A1 | 5/2016 |
| WO | 2018028716 A1 | 2/2018 |
| WO | 2018064525 A1 | 4/2018 |
| WO | 2019157801 A1 | 8/2019 |
| WO | 2020089779 A1 | 5/2020 |
| WO | 2020256745 A1 | 12/2020 |
| WO | 2021000801 A1 | 1/2021 |
| WO | 2021040501 A1 | 3/2021 |

* cited by examiner

SELF-MAPPING LISTENERS FOR LOCATION TRACKING IN WIRELESS PERSONAL AREA NETWORKS

CROSS-REFERENCE TO RELATED APPLICATIONS

This application is a continuation of U.S. patent application Ser. No. 17/408,348, filed on Aug. 20, 2021, entitled SELF-MAPPING LISTENERS FOR LOCATION TRACKING IN WIRELESS PERSONAL AREA NETWORKS, which is hereby incorporated by reference in its entirety.

BACKGROUND

Wireless personal area networks have become a nearly ubiquitous technology for enabling communications between electronic devices. In addition to facilitating user-initiated transfer of information, proliferation of these networks has also enabled passive communications between devices. One use case for such passive communication is tracking the location of electronic devices in a physical space, in which listening devices distributed throughout the physical space listen for wireless signals from the electronic devices. Using the wireless signals, the listening devices are able to approximate the location of an electronic device at the time it emitted the wireless signal. However, accuracy of these location estimations are often compromised by variability in the locations of the listening devices themselves.

BRIEF DESCRIPTION OF THE DRAWINGS

Detailed descriptions of implementations of the present invention will be described and explained through the use of the accompanying drawings.

Figure 1:
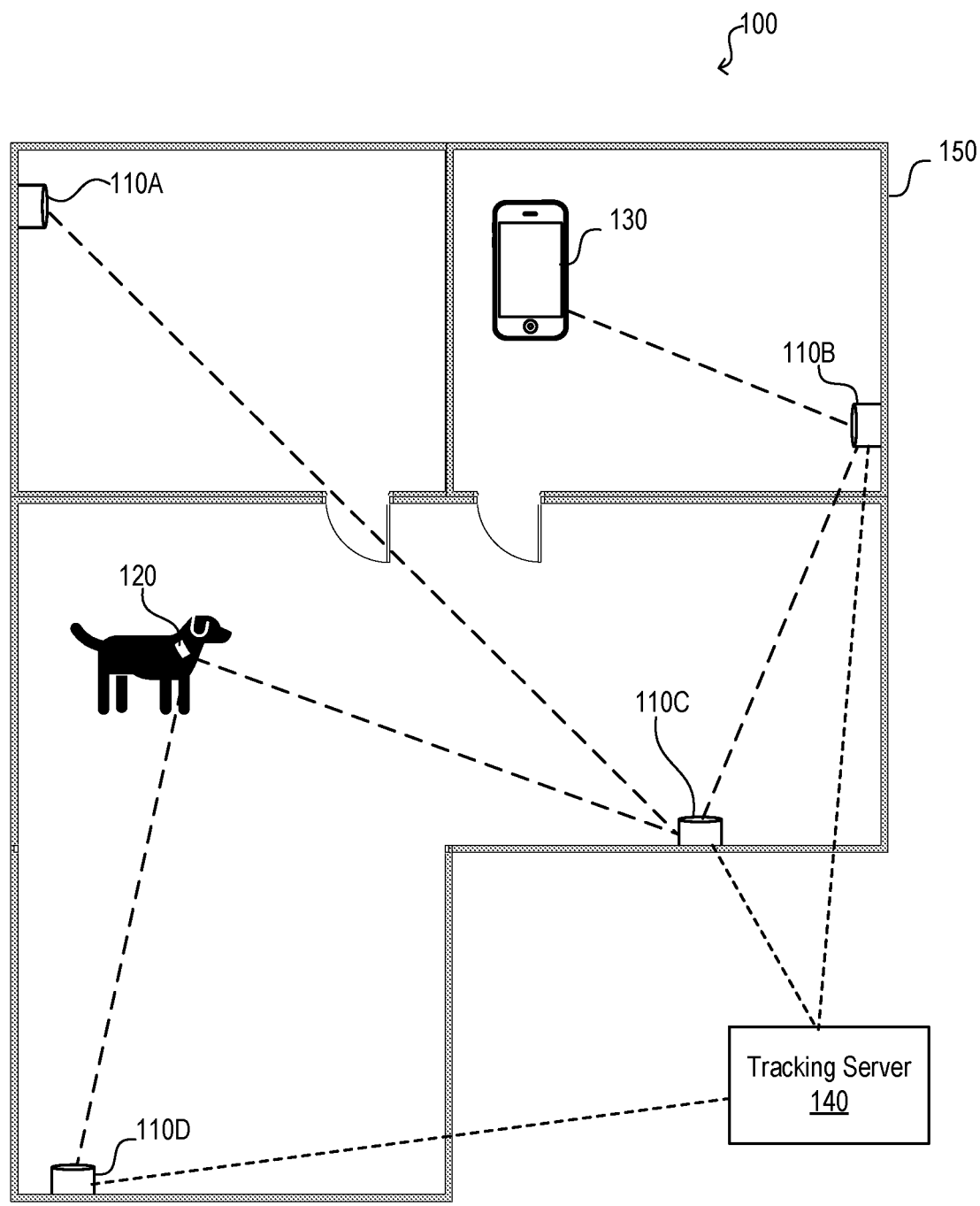
FIG. 1 is a diagram illustrating an example configuration of an object tracking environment.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

To improve accuracy and ease of use of listening devices for tracking object locations in a physical space, listening devices according to embodiments herein perform a self-mapping procedure. During the self-mapping procedure, each listening device generates or receives positional indicators that are associated with a position of the listening device in space or relative to another device. The positional indicators of the listening devices are used to correct or improve measurements of a location of a tracked object.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Overview

FIG. 1 is a diagram illustrating an example configuration of an object tracking environment 100. In the object tracking environment, listening devices 110 (also referred to herein as "listeners" 110) communicate with tracking devices 120, a user device 130, and/or a tracking server 140 in order to localize objects in a physical space 150.

The listening devices 110 are devices that are capable of receiving wireless signals output by external devices. Based on the wireless signals, the listening devices 110 determine positions of the external devices relative to the listening devices 110. Example implementations of the listening devices 110 include, but are not limited to, mobile phones, wearable devices, IoT devices, modems, wireless access points, mesh Wi-Fi nodes, smart speakers, smart televisions, or dedicated listeners (which, for example, are battery operated or which plug into a wall electrical socket, a universal serial bus (USB) port, or a vehicle's on board diagnostics (OBD) port). The listening devices 110 communicate with other devices via any of a variety of wireless personal area network (WPAN) protocols such as Bluetooth™ Low Energy (BLE), ultra-wideband (UWB) signals, or Zigbee™.

One or more listening devices 110 are placed in the physical space 150 in order to track locations of tracking devices 120 in or near the physical space. In general, the listening devices 110 communicate with the tracking devices 120 to either continually measure a position of the tracking device or to determine the tracking device's location at specified times (e.g., in response to a user request). By way of example, the listening devices 110 can continually track the location of a pet in a person's home by communicating with a pet tracking device 120 attached to the pet's collar (as illustrated in FIG. 1) to sample the pet's location at a predetermined interval of time (e.g., every 0.5 seconds, every second, or every minute). Listening devices 110 installed in a store can monitor the locations and movements of customers throughout the store by communicating with the customers' mobile phones/wearable devices. Other example implementations of the listening devices 110 can communicate with and output locations of devices in response to queries, including queries for locations of such devices as a person's mobile phone or a tracking device coupled to a set of keys. For example, one or more of the listening devices 110 broadcast a query that causes the tracking device 120 to output a tracking signal if the tracking device 120 receives the query.

To determine the location of a tracking device 120, the listening devices 110 in the physical space 150 use one or more current or historical tracking device location indicators, such as a direction from which the signal from the tracking device 120 is incident upon one or more of the listening devices 110, signal strength of the signal from the tracking device 120, time-of-flight between the listening device 110 and tracking device 120, and/or a rate of change of the angle, signal strength, or time-of-flight measurement. When calculating an angle of incidence of a signal, some implementations of the listening devices 110 use a direction-finding protocol, such as that specified in the BLE 5.1 standard or in ultra-wide band (UWB)-based standards. For example, the listening device 110 calculates a phase difference of the tracking device signal as received at two or more antennae of the listening device 110. The phase difference varies linearly with the incoming angle of the signal, thus enabling the listening device 110 to determine the angle from the calculated phase difference. When calculating a distance between the tracking device 120 and the listening device 110, some implementations of the listening device 110 calculate the distance based on a signal strength (e.g., RSSI) of the tracking device signal as received at the listening device 110. For example, the listening device 110 calculates a distance using the following formula:

$$distance = 10^{\frac{TxPower-RSSI}{10*n}}$$

where TxPower is a transmission power of the signal and n is a constant that depends on environmental factors (e.g., n=2 in free space).

Furthermore, some tracking devices 120 can include dead reckoning systems that generate data usable by the listening devices 110. For example, the dead reckoning system includes one or more inertial sensors that generate data indicative of a speed and/or direction of motion of the tracking device 120. After a first measurement of a position of the tracking device 120, a second position can be estimated by using the speed and/or angle generated by the dead reckoning system to calculate how far the tracking device 120 moved from the first position.

In some implementations, multiple listening devices 110 triangulate the position of the tracking device 120 based on the location indicators measured by each listening device 110. For example, as illustrated in FIG. 1, the listening device 110B receives a wireless signal from the mobile device 130. Using a direction-finding protocol, the listening device 110B calculates an angle at which the received wireless signal was incident upon the listening device 110, then stores the angle as the position of the mobile device 130 at the time of the measurement. In another example, a first listening device 110C calculates that the tracking device 120 coupled to a pet's collar is a first distance away from the first listening device 110C, based on a signal strength of a wireless signal transmitted between the first listening device 110C and the tracking device 120. Contemporaneously, a second listening device 110D uses a direction-finding protocol to determine the relative angle between the listening device 110D and the tracking device 120. The first and second listening devices 110C, 110D send their respective tracking device location indicators to the tracking server 140, which calculates the current position of the pet by triangulation with the distance between the tracking device 120 and the first listening device 110C, the angle between the second listening device 110D and the tracker 120, and a known distance and angle between the first and second listening devices 110C, 110D.

The listening devices 110 also generate positional indicators that are indicative of positions of the listening devices 110 themselves. Some implementations of the listening devices 110 include one or more sensors that generate respective signals or data points related to a position of the listening device, from which one or more positional indicators can be derived. One example position sensor is a multi-axis accelerometer, gyroscope, or compass that outputs a signal indicative of an orientation of the listening device 110 with respect to gravity or Earth's magnetic fields. Some implementations of the listening devices 110 include an altimeter (such as a barometer) that outputs a signal indicative of an elevation of the listening device 110. For example, based on comparison of the elevation signals from two listening devices 110, it can be determined that one of the listening devices 110 is on a lower floor of a building and the other listening device is on a higher floor of the building. Other types of position sensors used in some implementations measure properties of an environment around the listening device 110. For example, a listening device 110 can include a camera (e.g., to perform object detection of objects located near the listening device), a light sensor (e.g., to detect brightness or wavelength of light in a room where the listening device is located), a temperature sensor (e.g., to detect temperature in the room), or a capacitive or inductive sensor (e.g., to measure material properties of a surface adjacent to the listening device).

Instead of or in addition to the positional indicators derived from sensor data, the listening devices 110 can generate positional indicators based on signals received from other devices, such as other listening devices 110, tracking devices 120, or the user device 130. Some of these signals indicate relative distance or orientation of the listening device 110 to the other device. For example, a listening device 110 uses a direction-finding protocol to determine an angle between the listening device 110 and another listening device or the user device 130 based on a wireless signal transmitted between the respective devices. The listening devices 110 and/or user device 130 can use signal strength- or time-of-flight-based techniques associated with a wireless signal to measure the distance between the respective devices. Other signals received by a listening device 110 include explicit location information. For example, some implementations of the user device 130 contain a global positioning (GPS) sensor, and the listening device 110 retrieves the GPS location from the user device 130 when the user device 130 is proximate to the listening device 110. Alternatively, the signal can include explicit information input by a user of the user device 130.

The listening device 110 uses its own positional indicators to improve the process of tracking the tracking device 120 in the physical space 150. Some types of positional indicators refine the measurement of the tracking device's location by correcting the listening device's own measurements. For example, in implementations where the listening device 110 measures an angle between the listening device and the tracking device by calculating a phase difference of the tracking device signal when received at two or more antennae of the listening device, the listening device 110 can use the listening device's orientation to correct the measured angle of incidence of the received signal. For example, if the effective distance between the antennae of the listening device varies when the listening device 110 is positioned in different orientations, the positional indicators related to the orientation can be used to calculate the applicable effective distance. When measuring the angle to the tracking device 120, the listening device 110 more accurately calculates the angle from the phase difference of the incoming signal between two antennae using the effective distance, rather than a predetermined distance that assumes a certain orientation of the listening device 110. Other types of positional indicators refine the measurement of the tracking device's location by correcting the tracking device's measurements of its location. For example, a system can measure the altitude of a tracking device 120 in two ways: using a barometer within the tracking device 120, and using an altitude of the listening device 110 and an angle between the listening device and the tracking device. If these two measurements produce different values, either measurement can be used to correct the other.

The listening devices 110 can output their positional indicators and tracking device location indicators to an external device, such as the user device 130 or the tracking server 140, for further processing.

The user device 130 is a computing device that is capable of communicating wirelessly with the listening devices 110 and/or the tracking server 140. Example implementations of the user device 130 include a mobile phone, a laptop or desktop computer, a tablet, a smart watch, or smart glasses.

In some implementations, the user device 130 executes a tracking application that receives tracking device location indicators and provides a user interface for a user to request and view tracking device location information. For example, the application enables the user to request a current location of the tracking device 120 and, in response to the request, generates a display identifying a current location of the tracking device (e.g., by displaying an indicator on a map of the physical space, or by outputting a name of a room in which the tracking device is located). Users can also cause the application to output alerts based on tracking device locations. For example, the user can request an alert if a tracked pet leaves a specified room, which causes the application to output the alert if the pet's location is detected elsewhere other than the specified room. Some implementations of the application aggregate statistics related to movement of a tracked object, such as the amount of time the object spends in a given room within the physical space 150, timestamps indicating when the object entered or left the physical space, a total amount of the object's movement over a day or week, or portions of the day when the most or least amount of movement occurred. These statistics can be compiled and output to the user of the user device 130 via the application.

The user device 130 can receive the tracking device location indicators directly from the listening devices 110 or from another device, such as the tracking server 140. Similarly, the user device 130 can analyze the tracking device location indicators to derive the movement statistics of tracked objects, or can receive the statistics from the tracking server 140. Various implementations of the user device 130 perform the functionality of a listening device 110 or the tracking server 140, in addition to or instead of the functionality described above.

In some implementations, the user device 130 provides explicit positional indicators to the listening devices 110. These positional indicators can include information measured by a sensor in the user device 130. For example, if the user device 130 contains a GPS sensor, the user device 130 can send its GPS coordinates to a listening device 110 when in proximity to the listening device (e.g., within 5 feet of the listening device). Additionally or alternatively, the application executed by the user device 130 receives user input that relates to an explicit positional indicator. For example, when the listening device 110 is tracking the location of a pet, the listening device 110 sends a notification to the user device when the pet and the user device are determined to be within the same room. In response, the user device 130 outputs a prompt to the user to ask: "You are in the same room as your pet. What room are you in?" Based on the user's response, the listening device 110 identifies and stores the name of the room. In another example, the listening device 110 or tracking server 140 prompts the user to input position information via the user device 130 if the positional indicators of the listening devices appear erroneous.

The tracking server 140 includes one or more computing devices remote from the listening device 110 that receive and process tracking device location indicators and listening device positional indicators. Some implementations of the tracking server 140 interface between a set of listening devices 110 in a physical space and the application executed by the user device 130 in order to pass raw or analyzed listening device data to the user device 130. The tracking server 140 can additionally process raw signal data or positional indicators received from the listening devices 110 and return the processed results to the listening devices 110.

In some implementations, the tracking server 140 synthesizes tracking data and listening device positional indicators received from multiple listening devices in the physical space 150 to map the space and track object locations. As objects move throughout the space, each of the multiple listening devices 110 can gather information about the location of the object at different times. For example, in FIG. 1, the tracking device 120 attached to the pet is detectable by the listening devices 110C and 110D in the pet's illustrated position, but is not detectable by the listening device 110A due to an intervening wall. However, if the pet moves into the room containing the listening device 110A, the tracking device 120 may be detectable only by the listening device 110A. Additionally, in some cases, determining the location of the tracking device entails triangulating the location from measurements captured by multiple listening devices 110. Thus, the tracking server 140 aggregates tracking information generated by each of the listening devices 110 in the physical space 150 to identify and track the locations of the object in the space.

The tracking server 140 can use any of a variety of techniques or policies to identify and correct erroneous measurements generated by the listening devices 110. These techniques or policies can be used correct measurements associated with locations of listening devices themselves or measurements associated with the location of a tracking device. In some cases, the tracking server 140 uses data generated by a first subset of the listening devices 110 to correct data generated by a second subset of the listening devices. For example, the tracking server 140 can apply a majority voting policy by which three or more listening devices "vote" as to the correct value of a measurement. The value that receives a majority of the votes from among the set of listening devices is stored as the value of the measurement, while other values are disregarded.

In other cases, the tracking server 140 uses data generated by the same listening device 110 to correct the listening device's measurements. The tracking server 140 can determine if a measurement falls within a range expected for the value of a first measurement, where the range is determined based on the values of other measurements. Similarly, the tracking server 140 can applying Kalman filters, statistical data aggregated over time, or other similar techniques to verify whether current measurements by a listening device 110 are likely to be accurate given the device's previous measurements. If the tracking server 140 determines a measurement to be infeasible or likely erroneous, some implementations of the tracking server 140 disregard the measurement. For example, if one measurement of a distance between the listening device 110 and the tracking device 120 is erroneous but both a previous and subsequent distance measurement are not determined to be erroneous, the tracking server 140 removes the erroneous measurement and interpolates between the previous and subsequent measurements to replace the erroneous measurement. Other implementations of the tracking server 140 cause the listening device 110 to perform an additional test to verify the erroneous measurement. If, for example, a listening device 110 produces a measurement of its own position that is determined to be infeasible, the listening device can be caused to generate a different type of position measurement to verify or correct the erroneous measurement. Additionally or alternatively, the tracking server 140 prompts the user to provide information when an erroneous measurement is detected, either to confirm whether the measurement is correct or to explicitly input the correct measurement.

The tracking server 140 also uses the positional indicators of the listening devices 110 to map the tracking device locations to features in the physical space 150. In some implementations, the physical space 150 can be mapped using positional indicators generated over time based on the listening device's communications with other devices. By observing the paths of objects as they move around the physical space and corresponding signals received from the objects, for example, the tracking server 140 determines over time where walls, doorways, or obstructions are located in the physical space 150. For example, if the tracking server 140 determines over time that objects do not enter a given region of the physical space 150 that is approximately 6 inches wide and signal strength is significantly reduced when the region is located between the listening device 110 and the tracking device 120, the tracking server 140 infers that the region contains a wall. If the tracking server 140 determine that objects do not enter a given region but that signal strength is not reduced when the objects are positioned on the other side of the region from the listening device, the server 140 determines that the region contains a non-wall obstruction (such as a piece of furniture).

Additionally or alternatively, the tracking server 140 uses multiple types of positional measurements generated by the listening devices 110 to distinguish between walls and non-wall obstructions or to identify types of walls. For example, an RSSI-based distance measurement may be susceptible to an obstructing material (e.g., a wall) between the listening device and another device, whereas time-of-flight measurements are not significantly impacted by obstructions. The difference between RSSI- and time-of-flight-based distance measurements can also be affected by the type of wall because different materials cause greater or lesser signal attenuation. Thus, for example, if the tracking server 140 determines that a difference between an RSSI distance measurement at a first time and a time-of-flight distance measurement at the first time is within a range consistent with drywall, the tracking server 140 determines that the listening device 110 and another device are separated by an interior wall at the first time. If the tracking server 140 determines that the difference between RSSI and time-of-flight measurements at a second time falls within a range consistent with concrete and insulation, the tracking server 140 determines the listening device 110 and the other device are separated by an exterior wall at the second time. In contrast, if the tracking server 140 identifies a zone through which devices do not pass, but the difference between RSSI- and time-of-flight-based measurements is close to zero when devices are positioned on opposite sides of the zone, the tracking server 140 can infer that the zone contains a piece of furniture or other non-wall obstruction.

Positional indicators of the listening devices themselves can also be used to map the physical space 150. For example, based on accelerometer data generated by a listening device 110, the tracking server 140 determines whether the device is plugged into a vertical surface, plugged in on top of a horizontal surface, or plugged underneath a vertical surface—indicating, respectively, that the listening device 110 might be plugged into a wall outlet, a floor outlet, or a ceiling outlet. The tracking server 140 can also cause the listening device 110 to perform an additional test to verify whether it is plugged into a wall, ceiling, or floor, such as measuring a capacitance or electrical induction of the surface adjacent to the listening device 110. If the electrical properties of the surface falls within a range expected for the electrical properties of a wall, for example, the tracking server 140 determines that the listening device 110 is plugged into a wall. The wall location can then be stored in a map of the physical space 150.

The mapping of the physical space performed by the tracking server 140 enables the automatic identification of rooms or other sub-regions of the space. Similarly, the tracking server 140 can correct spurious location data based on the mapping of the physical space. For example, if the location data indicates that a tracked object suddenly passed through a wall, the tracking server 140 can correct the location data by adding interpolated location data points that pass through known openings or by disregarding or scaling any location data points that created the appearance of walking through a wall.

The tracking server 140 can further map the physical space 150 by deriving identities of rooms in the physical space from explicit or implicit data. As described above, the positional indicators can name sub-regions of the physical space 150, such as the floor of a building on which the listening device 110 is located, the name of a room in which the listening device 110 is located, or other such identifying information. Explicit data in the form of user inputs can define the names of sub-regions of the physical space, which the tracking server 140 maps to sub-regions it has identified by analyzing locations of walls, heights of floors, and other physical features of the space. With respect to deriving identities of rooms in the physical space using implicit data, some implementations of the tracking server 140 apply rules or heuristics to historical aggregates of tracking device positional indicators. For example, in a residential context, the tracking server 140 can identify a room to be a bedroom if the user device 130 is located in the room for at least a threshold number of hours at night. In a retail context, the tracking server 140 can identify a room to be an employee breakroom, for example, if only employees' user devices are detected in the room.

The mapping of the physical space can be used to label tracking data in a manner that is understandable to a user. When capturing a location of a tracking device 120, the tracking server 140 can match the tracking device 120 location to the sub-region naming information contained in the positional indicators. For example, if a user defines a rule to output an alert whenever a pet is located in a room labeled as "Master Bedroom," the tracking server 140 can use the name of the room defined in the positional indicator to match to the pet's location and cause the output of the defined alert whenever the pet is detected to be located in the master bedroom. Similarly, in response to a query for the location of an object (such as a set of keys), the tracking server 140 can output a name of the location rather than merely the distance or angle between the object and the listening device (e.g., "The keys are in the second-floor bathroom").

Implementations of the tracking server 140 calculate movement statistics of a tracked object in the physical space, instead of or in addition to the movement statistics described above as being calculated by the user device 130. For example, the tracking server 140 can use the mapping of the physical space to calculate an amount of time the tracking device 120 is located in a particular room or on a particular floor, a number of times the tracking device 120 enters or exits the room or changes floors, hours of the day when the tracking device is most likely to be located in a particular room or on a particular floor, or other such statistics.

Listening Device Configurations

Figure 2:
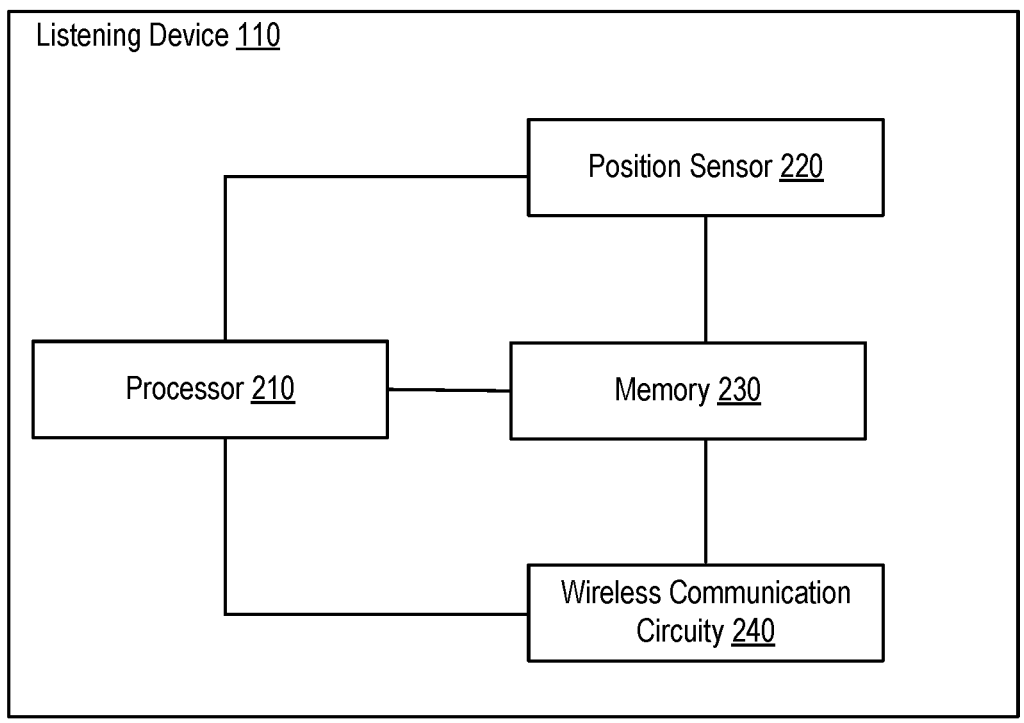
FIG. 2 is a block diagram illustrating components of an example listening device.

FIG. 2 is a block diagram illustrating components of an example listening device 110. As shown in FIG. 2, the listening device 110 includes one or more processors 210, one or more position sensors 220, a memory 230, and wireless communication circuitry 240.

The processor 210 is communicatively coupled to the position sensors 220, the memory 230, and the wireless communication circuitry 240. By executing instructions stored in a computer readable storage medium, such as the memory 230, the processor 210 performs actions such as analyzing data generated by the position sensors 220, analyzing signals received from external devices via the wireless communication circuitry 240, storing data in the memory 230, or packaging data for output via the wireless communication circuitry 240. The one or more processors 210 can include programmable circuitry (e.g., one or more microprocessors) programmed with software and/or firmware, special-purpose hardwired (i.e., non-programmable) circuitry, or a combination or such forms. Special-purpose circuitry can be in the form of, for example, one or more application-specific integrated circuits (ASICs), programmable logic devices (PLDs), field-programmable gate arrays (FPGAs), etc.

The one or more position sensors 220 include any of a variety of types of sensors that generate data indicative of a position of the listening device 110. The position data generated by the sensors can relate to a position of the listening device relative to the Earth or relative to other objects. Accordingly, example position sensors 220 include a compass, a global positioning (GPS) sensor, an accelerometer, a gyroscope, an altimeter, a dead reckoning system, a camera, a light sensor, a temperature sensor, a capacitive or inductive sensor, or a processor to process wireless communications.

The wireless communication circuitry 240 includes one or more transmitters, receivers, or transceivers, as well as corresponding processing circuitry, configured to communicate according to a wireless communication protocol. Some implementations of the wireless communication circuitry 240 include a multi-antenna array and a microcontroller unit that is capable of executing software compliant with a Bluetooth standard, such as the BLE 5.1 standard. Other implementations include a chipset for communicating via UWB communications, Wi-Fi, and/or a cellular network (such as 4G or 5G networks).

Self-Mapping by Listening Devices

Figure 3:
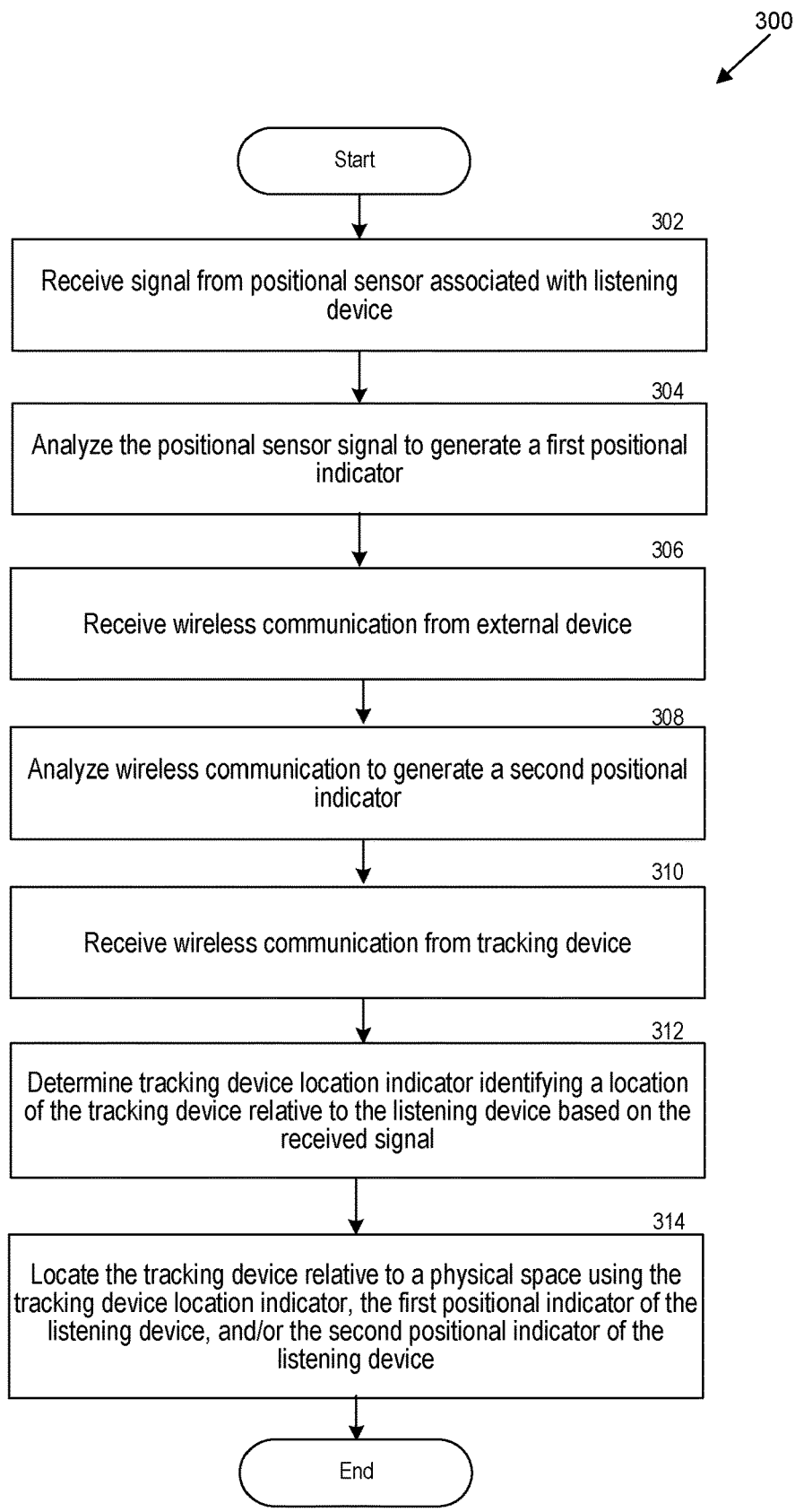
FIG. 3 is a flowchart illustrating a process to track object locations in a physical space based at least in part on self-mapping of listening devices.

FIG. 3 is a flowchart illustrating a process 300 to track object locations in a physical space based at least in part on self-mapping of listening devices 110, according to some implementations. Steps of the process 300 shown in FIG. 3 can be performed by a listening device 110. Other implementations of tracking and self-mapping processes include additional, fewer, or different steps, or perform the steps in different orders.

As shown in FIG. 3, the listening device 110 receives a signal from a positional sensor associated with the listening device at block 302. At block 304, the listening device analyzes the positional sensor signal to generate a first positional indicator. In some implementations, the positional sensor is a gravitational sensor (such as an accelerometer or gyroscope) that outputs a signal identifying a direction of gravity relative to the listening device, and the analysis of the sensor signal includes determining an orientation of the listening device 110 relative to gravity. For example, the listening device 110 stores a reference vector that indicates what the value of the gravitational sensor signal would be if a specified axis of the listening device 110 is aligned parallel to the direction of gravity. The listening device 110 calculates an angle between the actual gravitational vector output by the gravitational sensor and the reference vector. The calculated angle can be stored as the first positional indicator of the listening device 110. Similarly, where the positional sensor is a compass, the listening device 110 can calculate an angle between a reference compass vector and an actual compass vector received from the compass, storing this angle as another type of first positional indicator of the listening device. In implementations where the positional sensor is an altimeter, the listening device 110 can store the altitude measurement received from the altimeter as yet another type of first positional indicator of the listening device. Likewise, when the positional sensor is a GPS sensor, the listening device 110 stores the GPS coordinates of the listening device as the first positional indicator. Other types of first positional indicators can be calculated and stored based on different types or combinations of positional sensor signals.

At block 306, the listening device 110 receives a wireless communication from an external device, such as another listening device 110, a tracking device 120, or a user device 130. At block 308, the listening device 110 analyzes the received communication to generate a second positional indicator. In some implementations, the listening device 110 derives information about the listening device's position relative to the external device using characteristics of the received communication. For example, the listening device 110 calculates an angle of arrival of a wireless signal by measuring a phase difference of the signal at each of two or more antennas in the listening device 110. The angle of arrival can be stored as a positional indicator related to an angle between the listening device 110 and the external device. In another example, the listening device 110 estimates a distance between the listening device 110 and the external device using the RSSI of the incoming wireless signal.

In other implementations, the analysis performed by the listening device at block 308 includes extracting the second positional indicator from the wireless communication received from the external device. For example, the communication received from the external device can contain explicit information about the location of the listening device, such as the GPS coordinates of the external device or an identification of a room in which the listening device is located.

At block 310, the listening device 110 receives a wireless communication from a tracking device 120. In some cases, the tracking device broadcasts a signal at predefined time intervals (e.g., once per second), and the listening device 110 receives the signal if the listening device is within range of the tracking device's location at the time the signal is output. In other cases, the listening device 110 queries the tracking device for its location, and the wireless communication received at block 308 is a communication generated by the tracking device in response to the query.

The listening device 110 uses the received communication from the tracking device to determine, at block 312, a tracking device location indicator that identifies a position of the tracking device relative to the listening device. In various implementations, the tracking device location indicator can include an angle of arrival of the wireless communication at the listening device, a distance determined based on a signal strength of the communication signal, or a combination of angle and distance. In some implementations, the tracking device location indicator further includes a rate of change of the angle or distance of the tracking device from the listening device. For example, the listening device 110 uses a set of multiple consecutive incoming signals from the tracking device 120 to determine an angular distance moved by the tracking device during the time between the first and last signals in the set. The listening device 110 then calculates an average angular velocity of the tracking device by dividing the distance moved by the amount of time intervening between the first and last signals.

At block 314, the listening device 110 locates the tracking device in a physical space using the tracking device location indicator, the first positional indicator of the listening device, and/or the second positional indicator of the listening device. For example, if the tracking device location indicator identifies an angle between the listening device 110 and the tracking device 120, the listening device 110 corrects a measurement of the tracking device's location by modifying the measured angle based on a known orientation of the listening device 110. In another example, the listening device 110 locates the tracking device according to features of the physical space, such as identifying a floor on which the tracking device is located based on an altitude measurement of the listening device 110.

Steps of the process 300 can be performed at predetermined times or in response to specified events. For example, a listening device 110 performs the process 300 upon activation of the listening device 110 (e.g., when the listening device 110 is first activated, or when first powered on after being unplugged or being recharged), when the listening device detects another listening device 110 in the physical space has been activated or powered on, or at specified intervals (e.g., once per day). Furthermore, some of the steps of the process 300 are performed whenever the relevant signals are available. For example, the listening device 110 generates a new positional indicator or verifies or refines an existing positional indicator (at block 304) whenever the listening device 110 receives a wireless communication from an external device.

Figure 4:
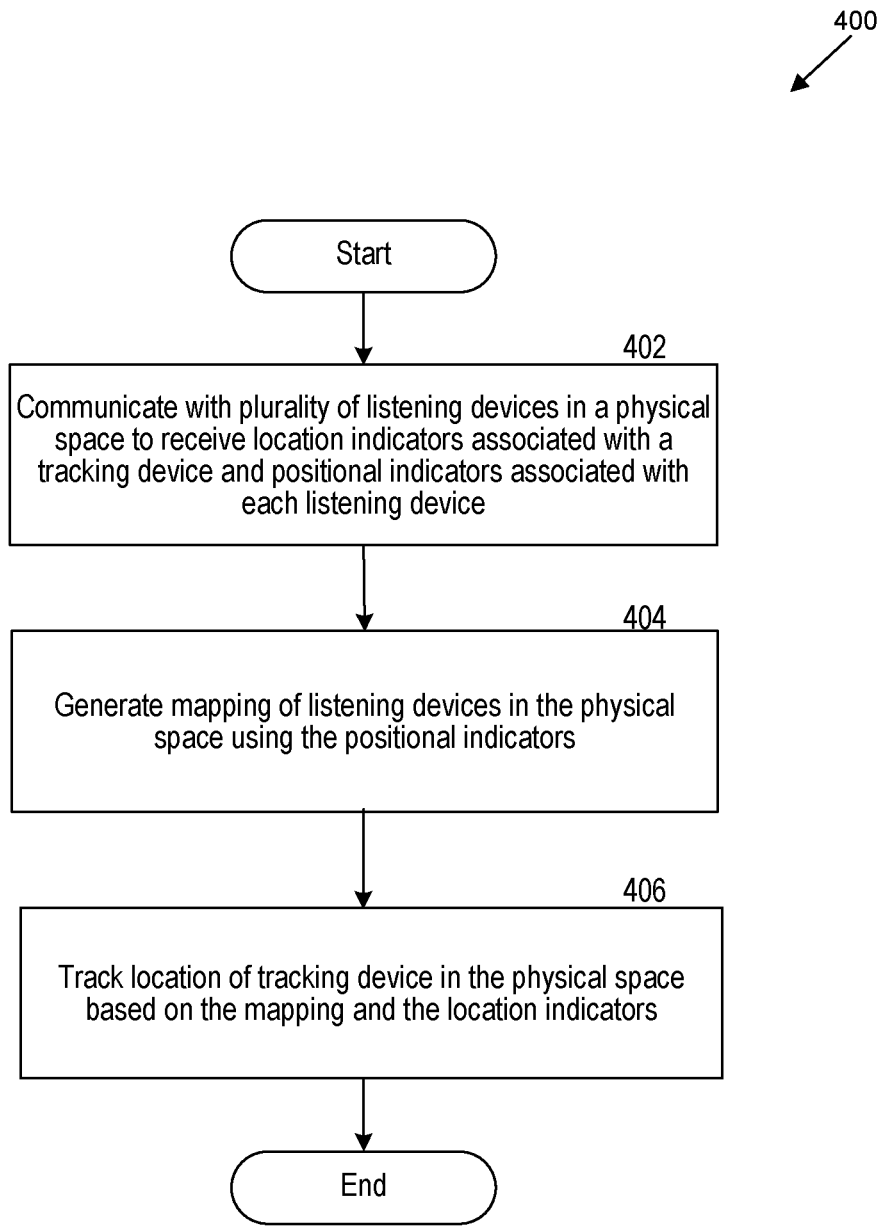
FIG. 4 is a flowchart illustrating another implementation of a process to track object locations in a physical space based at least in part on self-mapping of listening devices.

Tracking Object Locations in a Physical Space Based on Self-Mapped Listening Devices FIG. 4 is a flowchart illustrating another implementation of a process to track object locations in a physical space based at least in part on self-mapping of listening devices 110. Steps of the process shown in FIG. 4 can be performed by a computing system in communication with multiple listening devices 110, such as the user device 130 or the tracking server 140. Other implementations of the process include additional, fewer, or different steps, or perform the steps in different orders.

As shown in FIG. 4, the computing system communicates with a plurality of listening devices in a physical space at block 402. From each of the listening devices, the computing system receives location indicators, which are associated with a location of a tracking device measured by the corresponding listening device, and one or more positional indicators, which are associated with the listening device.

At block 404, the computing system generates a mapping of the listening devices in the physical space using the positional indicators. For example, the computing system determines a distance between two listening devices based on a strength of a signal transmitted between the two devices, or determines an angle between two listening devices based on an angle at which a signal from one listening device arrives at the other listening device. Mapping the listening devices in the physical space can also include determining a first listening device is located on a first floor and a second listening device is located on a second floor based on altitude measurements of the first and second listening devices. For example, the computer system determines an altitude of the second listening device is greater than an altitude of the first listening device by at least a threshold height, such as ten feet. The computer system can further map the listening devices in the physical space by identifying rooms in which the listening devices are located. For example, the computer system can identify rooms based on explicit user inputs to name the room, or by deriving characteristics of the room from implicit data (such as types of devices that are in the room at certain times of day).

At block 406, the computing system tracks a location of the tracking device in the physical space based on the mapping of the listening devices and the location indicators associated with the tracking device. In some cases, the computing system modifies a set of location indicators associated with the tracking device based on the mapping of the listening devices. Such modification can improve the accuracy of the location measurements. For example, the computing system recalculates an angle between a listening device and the tracking device using an orientation of the listening device, or removes historical location indicators that are determined to be spurious based on known feature of the physical space. In other cases, the computing system uses the mapping of the physical space to locate the tracking device in particular sub-regions of the physical space, rather than merely outputting the tracking device's location as a position relative to one or more of the listening devices 110. For example, the tracking server 140 identifies the tracking device to be located in a particular named room in the physical space or located on a specified floor of the physical space. Furthermore, the tracking server 140 can aggregate statistics related to movements of the tracking device based on the mapping of the listening devices in the physical space.

Computer System

Figure 5:
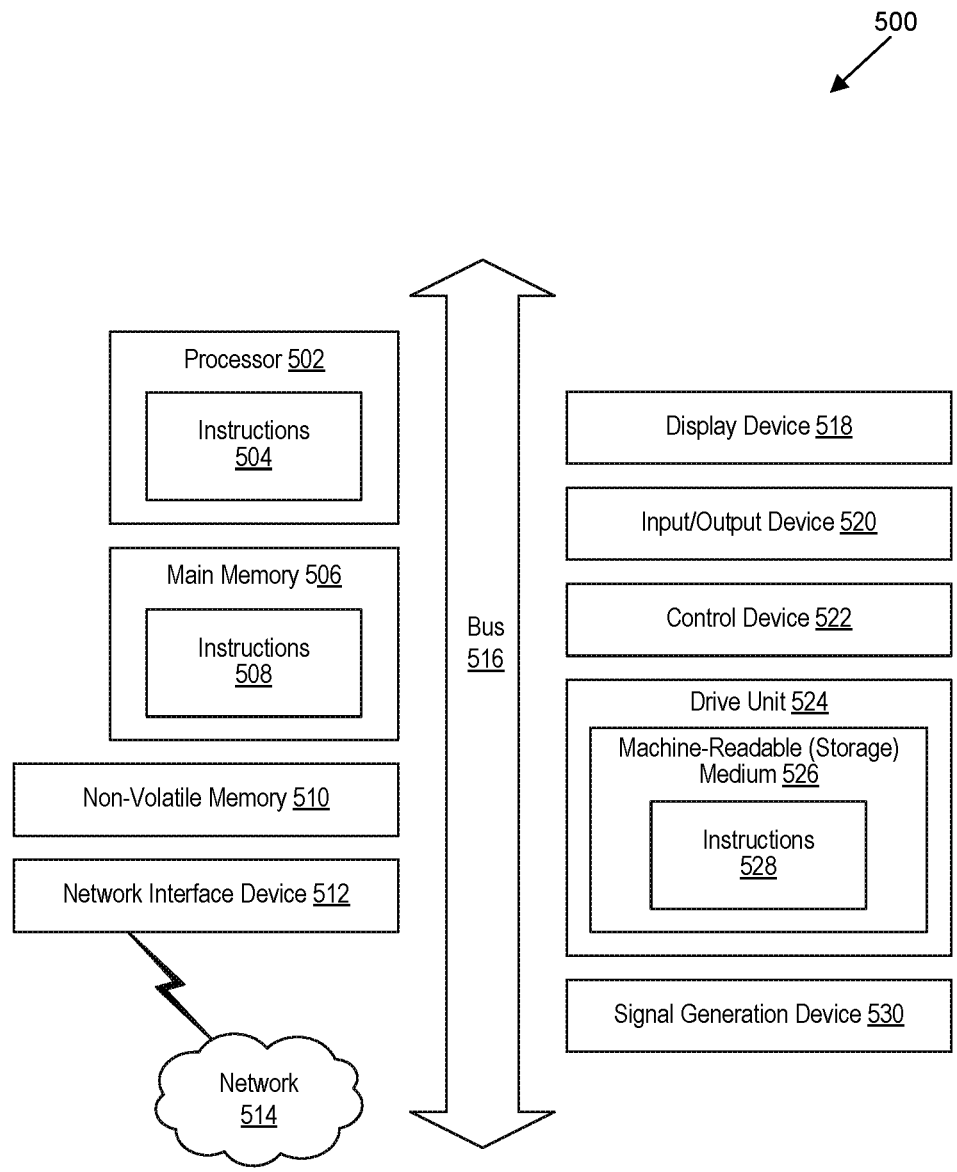
FIG. 5 is a block diagram that illustrates an example of a computer system in which at least some operations described herein can be implemented.

FIG. 5 is a block diagram that illustrates an example of a computer system 500 in which at least some operations described herein can be implemented. For example, one or more of the listening devices 110, the user device 130, or the tracking server 140 can be implemented as the computer system 500. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers.

Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A listening device for tracking locations of tracking devices in a physical space, the listening device comprising:
   at least one wireless transceiver;
   one or more sensors each configured to generate a respective signal indicative of a position of the listening device in the physical space; and
   one or more processors communicatively coupled to the at least one wireless transceiver and the one or more sensors, the one or more processors configured to execute instructions that causes the one or more processors to:
      generate at least one positional indicator associated with the listening device based on the signals generated by the one or more sensors;
      wirelessly communicate with a tracking device in the physical space by:
         transmitting a query for a location of the tracking device via the at least one wireless transceiver, wherein the query causes the tracking device to output a tracking signal; and
         receiving the tracking signal from the tracking device via the at least one wireless transceiver;
      identify a position of the tracking device relative to the listening device based on the wireless communication with the tracking device; and
      locate the tracking device within the physical space based on the identified position of the tracking device relative to the listening device and the one or more positional indicators associated with the listening device.

2. The listening device of claim 1, wherein generating the one or more positional indicators associated with the listening device comprises analyzing the signals generated by the one or more sensors to: determine an orientation of the listening device with respect to gravity, or an orientation of the listening device with respect to a compass direction, or global positioning coordinates of the listening device, or an altitude of the listening device.

3. The listening device of claim 1, wherein the instructions further cause the one or more processors to generate another positional indicator associated with the listening device by:
   receiving a signal from a second listening device via the at least one wireless transceiver; and
   calculating a distance or angle or both between the listening device and the second listening device based on the signal received from the second listening device.

4. The listening device of claim 1, wherein the instructions further cause the one or more processors to generate another positional indicator associated with the listening device by receiving a communication from a user device via the wireless transceiver.

5. The listening device of claim 1, wherein the positional indicators associated with the listening device include an orientation of the listening device relative to one or more axes, and wherein locating the tracking device in the physical space comprises correcting the identified position of the tracking device relative to the listening device based on the orientation of the listening device.

6. The listening device of claim 1, wherein the instructions cause the one or more processors to generate the one or more positional indicators automatically upon activation of the listening device.

7. The listening device of claim 1, wherein the instructions further cause the one or more processors to, upon activation of the listening device, transmit a signal to a second listening device via the wireless transceiver, wherein the second listening device is configured to generate a respective positional indicator of the second listening device based on the transmitted signal.

8. A method comprising:
   generating, by a listening device, at least one positional indicator associated with the listening device based on signals generated by one or more sensors of the listening device;
   wirelessly communicating with a tracking device by:
      transmitting, from the listening device, a query for a location of the tracking device, wherein the query causes the tracking device to output a tracking signal; and
      receiving the tracking signal from the tracking device;
   identifying a position of the tracking device relative to the listening device based on the wireless communication with the tracking device; and
   locating the tracking device within a physical space based on the identified position of the tracking device relative to the listening device and the one or more positional indicators associated with the listening device.

9. The method of claim 8, wherein generating the one or more positional indicators associated with the listening device comprises analyzing the signals generated by the one or more sensors to: determine an orientation of the listening device with respect to gravity, or an orientation of the listening device with respect to a compass direction, or global positioning coordinates of the listening device, or an altitude of the listening device.

10. The method of claim 9, wherein generating the one or more positional indicators associated with the listening device comprises at least one of:
calculating an angle between the tracking device and the listening device based on an angle at which the wireless communication was received from the tracking device, or
calculating a distance between the tracking device and the listening device based on a signal strength of the wireless communication received at the listening device.

11. The method of claim 8, wherein generating the one or more positional indicators associated with the listening device comprises extracting explicit position information from the wireless communication received from the tracking device.

12. The method of claim 8, wherein generating the one or more positional indicators comprises generating at least one positional indicator automatically upon activation of the listening device.

13. The method of claim 8 further comprising:
receiving a signal from a second listening device; and
calculating a distance or angle or both between the listening device and the second listening device based on the signal received from the second listening device.

14. At least one computer-readable storage medium, excluding transitory signals and carrying instructions, which, when executed by at least one data processor of a system, cause the system to:
generate at least one positional indicator associated with a listening device based on signals generated by one or more sensors in the listening device;
upon activation of the listening device, transmit a signal to second listening device,
wherein the second listening device is configured to generate a respective positional indicator of the second listening device based on the transmitted signal;
wirelessly communicate with a tracking device by:
transmitting a query for a location of the tracking device, wherein the query causes the tracking device to output a tracking signal; and
receiving the tracking signal from the tracking device;
identify a position of the tracking device relative to the listening device based on the wireless communication with the tracking device; and
locate the tracking device within a physical space based on the identified position of the tracking device relative to the listening device and the one or more positional indicators associated with the listening device.

15. The computer-readable storage medium of claim 14, wherein generating the one or more positional indicators associated with the listening device comprises analyzing the signals generated by the one or more sensors to: determine an orientation of the listening device with respect to gravity, or an orientation of the listening device with respect to a compass direction, or global positioning coordinates of the listening device, or an altitude of the listening device.

16. The computer-readable storage medium of claim 14, wherein the instructions further cause the one or more processors to generate another positional indicator associated with the listening device by:
receiving a signal from a second listening device; and
calculating a distance or angle or both between the listening device and the second listening device based on the signal received from the second listening device.

17. The computer-readable storage medium of claim 14, wherein the instructions further cause the one or more processors to generate another positional indicator associated with the listening device by receiving a communication from a user device.

18. The computer-readable storage medium of claim 14, wherein the positional indicators associated with the listening device include an orientation of the listening device relative to one or more axes, and wherein locating the tracking device in the physical space comprises correcting the identified position of the tracking device relative to the listening device based on the orientation of the listening device.

19. The computer-readable storage medium of claim 14, wherein the instructions cause the one or more processors to generate the one or more positional indicators automatically upon activation of the listening device.

20. The computer-readable storage medium of claim 14, wherein generating the one or more positional indicators associated with the listening device comprises at least one of:
calculating an angle between the tracking device and the listening device based on an angle at which the wireless communication was received from the tracking device, or
calculating a distance between the tracking device and the listening device based on a signal strength of the wireless communication received at the listening device.

* * * * *